United States Patent [19]

Petrov et al.

[11] Patent Number: 4,864,555
[45] Date of Patent: Sep. 5, 1989

[54] OPTICAL INFORMATION CARRIER, METHOD FOR ERASING INFORMATION THEREIN, AND OPTICAL STORAGE DEVICE REALIZING THIS METHOD

[76] Inventors: Vyacheslav V. Petrov, ulitsa Montazhnikov, 104, Kiev; Nikolai V. Gorshkov, Leninsky prospekt, 52, kv. 416, Moscow; Alexandr A. Antonov, prospekt Vernadskogo, 85, kv. 64, Kiev; Andrei A. Krjuchin, ulitsa Juliusa Fuchika, 8, kv. 13, Kiev; Alexandr P. Tokar, prospekt Korneichuka, 30, kv. 161, Kiev; Semen M. Shanoilo, ulitsa A.Malyshko, 15, kv. 27, Kiev; Dmitry A. Grinko, ulitsa Akademika Dobrokhotova, 4, kv. 71, Kiev; Tatyana I. Sergienko, ulitsa Akademika Tupoleva, 7, kv. 111, Kiev; Gennady J. Judin, ulitsa Geroev Stalingrada, 15, kv. 70, Kiev; Evgeny E. Antonov, ulitsa Nekrasovskaya, 98, kv. 20, Kiev; Vladislav I. Popovich, prospekt Vernadskogo, 67, kv. 78, Kiev, all of U.S.S.R.

[21] Appl. No.: 136,924

[22] PCT Filed: Feb. 5, 1987

[86] PCT No.: PCT/SU87/00021
§ 371 Date: Oct. 6, 1987
§ 102(e) Date: Oct. 6, 1987

[87] PCT Pub. No.: WO87/04843
PCT Pub. Date: Aug. 13, 1987

[30] Foreign Application Priority Data

Feb. 7, 1986 [SU] U.S.S.R. .............................. 3134542
Feb. 7, 1986 [SU] U.S.S.R. .............................. 3136659

[51] Int. Cl.$^4$ .................. G11B 7/00; G01D 15/10; H04N 1/21

[52] U.S. Cl. ........................ 369/100; 369/111; 369/113; 369/121; 369/124; 369/126; 346/76 L; 346/125; 346/138; 358/296; 358/300

[58] Field of Search ............... 369/100, 124, 126, 111, 369/112, 113, 110, 121, 179, 146, 151, 143; 346/5, 6, 76 L, 138, 103, 125, 126, 127, 132; 358/296, 300, 301

[56] References Cited

U.S. PATENT DOCUMENTS

| | | | |
|---|---|---|---|
| 4,074,282 | 2/1978 | Balas, Jr. et al. | 346/76 L |
| 4,403,318 | 9/1983 | Nagashima et al. | 369/100 |
| 4,443,806 | 4/1984 | Ando | 346/76 L |
| 4,449,138 | 5/1984 | Ando | 346/76 L |
| 4,517,574 | 5/1985 | Cornet | 346/76 L |
| 4,519,061 | 5/1985 | Dahneke et al. | 369/109 |
| 4,561,086 | 5/1983 | Geyer | 369/100 |
| 4,585,933 | 4/1986 | Ando | 369/44 X |
| 4,616,356 | 10/1986 | Wilkinson et al. | 369/111 |
| 4,710,779 | 12/1987 | Funaki et al. | 346/76 L |
| 4,716,283 | 12/1987 | Ando | 369/45 X |
| 4,801,950 | 1/1989 | Frehling | 346/76 L |

FOREIGN PATENT DOCUMENTS

| | | | |
|---|---|---|---|
| 2721334 | 12/1977 | Fed. Rep. of Germany | 346/76 L |
| 3203599 | 12/1982 | Fed. Rep. of Germany | 369/100 X |
| 2482756 | 11/1981 | France | 369/100 X |
| 1580398 | 12/1980 | United Kingdom | 369/100 X |

Primary Examiner—William L. Sikes
Assistant Examiner—Brian M. Healy
Attorney, Agent, or Firm—Lilling & Greenspan

[57] ABSTRACT

An optical information carrier includes a cylinder (1) with a recording layer (2) and bushings (3,4) located at butt ends of the hollow cylinder (1) and insulating the recording layer (2) from the environment. A method for erasing information recorded on the optical carrier uses a high-frequency electrical discharge is produced inside the air-tight closed space (5) of the hollow cylinder (1). An optical storage device realizing the method includes an erasing unit (11) having a circuit for initiating a high-frequency discharge, which has electrodes (12,13) between which the optical carrier (10) is located so that the high-frequency discharge is initiated inside the closed air-tight space (5).

6 Claims, 2 Drawing Sheets

OPTICAL INFORMATION CARRIER, METHOD FOR ERASING INFORMATION THEREIN, AND OPTICAL STORAGE DEVICE REALIZING THIS METHOD

BACKGROUND OF THE INVENTION

Field of the Invention

This invention relates to information storage and processing devices and, in particular, is concerned with optical information carriers, methods for erasing information in such optical carriers, and optical memories realizing such method.

Description of the Prior Art

Known in the art is an optical information carrier (GB,B, 1580398) comprising two disks disposed coaxially so that a space available between them is limited by two coaxial separating elements to form an enclosure. A recording medium is provided on one of the opposing surfaces inside the closed space.

Also known in the art is an optical information carrier (GB,B, 1580398) comprising a hollow cylinder, a recording medium applied on the external surface thereof, and a second cylinder enclosing the first cylinder. Disposed between the two cylinders are two resilient sealing elements which confine a cylindrical closed space adjoining the recording medium.

The known optical information carriers are deficient in that the connection between the disks and separating rings or between two cylinders is temporary and an adhesive material is used. This is required to develop the information after it had been recorded on the recording medium an, to this end, access to the recording medium is necessary.

The known optical information carrier cannot provide adequate protection of the recording medium from dirt since its internal space is not air-tight. Cyclic day-night changes in the temperature of the environment result in that dust and moisture is sucked into the internal space of the carrier together with air and the recording medium surface is gradually coated with dirt. One more disadvantage of the known optical information carrier is that it cannot provide multiple rewrite capability because of the dirty surface of the recording medium of the carrier.

Known in the art are also memory devices (FR,B, 2482756) comprising an optical information carrier made as a disk comprising a base and a recording layer whereon information is recorded by way of light beams.

Also known in the art is a method of erasing information, which consists in that recorded portions of the medium are exposed to a light beam so that they are reversibly brought into a state with the initial optical properties, this exposure changing the degree of crystallization of the recording medium therein.

This method is deficient in that information recorded on such a carrier is easily damaged by, for example, sun radiation or heat.

The erasure method takes too much time because the carrier has to be heated slowly and the desired temperature has to be kept very precisely.

The method for erasing information described above is not efficient. Repeated recordings are not reliable because recording-erasing cycles adversely affect the structure of the recording layer and its thickness becomes non-uniform. This sharply reduces the number of rewrite cycles.

Also known in the art is an optical memory (US,A, 4403318) comprising an optical information carrier, an information recording and reading unit, an erasing unit, and a selection switch to choose recording, reading, or erasing modes of operation.

Known in the art is a method for erasing information recorded on an optical carrier (US,A, 4403318), which consists of a carrier is exposed to an external source for erasing information, e.g. by generating two or more light beams, focusing them on the optical carrier, and scanning these beams along the recording layer on the optical carrier so that portions of this recording layer are heated to different degrees. This is achieved by changing the light beam density by changing the radiation intensity or the size of the spot.

These prior art methods are deficient in that they cannot provide multiple use of optical carriers for the same reasons as described above.

SUMMARY OF THE INVENTION

The invention is to provide an optical information carrier, a method of erasing information therein, and an optical memory realizing this method, which offer the advantage of multiple repeated recordings of information on the same optical carrier after each erasure of information therefrom.

The above objectives are achieved by an optical information carrier comprising a hollow cylinder, a recording layer interconnected with the hollow cylinder and intended for recording information thereon, and two bushings disposed each in the butt end of the hollow cylinder to form a closed space in said cylinder. According to the invention, the closed space is air-tight and the recording layer disposed inside the sealed internal space is insulated from the environment.

It is advisable that the air-tight space be filled with a gas inert to the materials of the recording layer and the hollow cylinder.

The optical information carrier may comprise a second hollow cylinder disposed coaxially inside the first hollow cylinder and provided with a recording medium located on the external surface thereof, which faces the recording layer of the first cylinder, while bushings may be made ring-shaped and form an air-tight closed space between the cylinders.

The objects of the invention are also achieved by that in a method of erasing information recorded on an optical information carrier, consisting in that the optical information carrier is exposed to an external irradiation erasing recorded information. According to the invention, the external irradiation is an electrical field ensuring a high frequency discharge within the air-tight closed space of the optical information carrier.

It is desirable that the optical information carrier be capable of rotating about its axis.

This is achieved by an optical memory comprising an optical information carrier having a recording layer in a hollow cylinder, an information recording and reading unit and an information erasing unit. According to the invention, the erasing unit comprises a high-frequency discharge initiating circuit having at least two electrodes, while the optical information carrier whose air-tight closed space is filled with a gas inert in relation to the materials of the recording layer and the hollow cylinder is disposed between the electrodes so that the high-frequency discharge is initiated only inside the air-tight closed space thereof.

It is advisable that each electrode of the high-frequency discharge initiating circuit be arranged so that a part of a surface is formed coaxial with the cylindrical optical carrier.

It is also advisable that one electrode of the high-frequency discharge initiating circuit be located inside the air-tight closed space of the hollow cylinder, while other electrodes are arranged outside this hollow cylinder.

In case the optical information carrier is provided with two coaxial hollow cylinders with an air-tight closed space located between said cylinders, the optical memory should advisably have one electrode of the high-frequency discharge initiating circuit located inside the space of the second hollow cylinder, while other electrodes may be located outside the first hollow cylinder.

The optical information carrier disclosed herein can be used many times since its design and the method for erasing information, combined with a device of erasing information, ensure that a high-quality recording layer is each time regenerated on the surface thereof.

BRIEF DESCRIPTION OF THE DRAWINGS

The invention will now be described in greater detail with reference to specific embodiments and to the accompanying drawings, wherein.

DESCRIPTION OF THE PREFERRED EMBODIMENT

Figure 1:
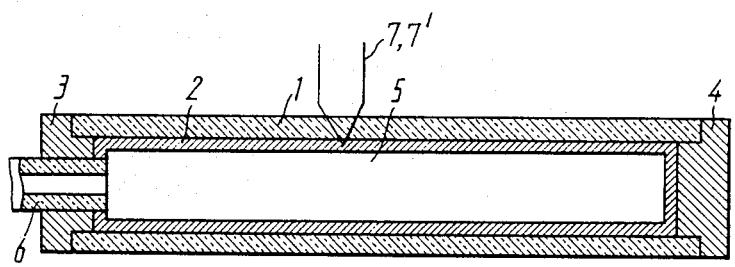
FIG. 1 illustrates an optical information carrier, according to the invention.

An optical information carrier comprises a hollow cylinder 1 (FIG. 1) made of, for example glass or some other material transparent to laser radiation. A recording layer 2 is applied on the internal surface of the hollow cylinder 1, this layer 2 bing a 50-200 nm thick film.

The recording layer 2 is made by a known method and the material of the layer 2 is Te, In, Ag, Au, Tl, Ge, or Cd or combinations of alloys of Te, Bi, Cd, Tl with S, Se or Sb.

Bushings 3 and 4 are placed in the butt ends of the hollow cylinder 1 to form a closed air-tight space 5, the layer 2 being disposed inside said space 5 and is thus insulated from the invironment.

A pipe 6 is provided in the bushing 3 to evacuate air from the space 5.

The air-tight space 5 is filled with a gas, e.g. argon or nitrogen, which is inert in relation to the material of the layer 2 and the cylinder 1. The pressure of gas inside the cylinder 1 can be 0,001–1,0 mm Hg or 0,1–100 Pa and it is achieved by the evacuation through the pipe 6.

Both the external and internal pressures are surplus pressure in relation to the carrier. This is the reason the carrier is made as a cylinder because with minimal wall thickness such carrier can better withstand excess pressure from any direction. In this way the carrier is made substantialy stronger mechanically.

The optical information carrier operates as follows.

During recordings, a focused beam 7 is directed to the recording layer 2 of the optical information carrier, said beam 7 having its intensity or the spot shape or area modulated by any known method by the signal to be recorded.

The optical information carrier is capable of rotating about its geometrical axis 8 by any known drive, e.g. an electrical drive (not shown).

The laser beam 7 makes respective changes in the relief of the surface of the recording layer 2 to record information. In this case, all other conditions being equal, the power of the laser beam required for recording is inversely proportional to the amount of surface energy of the material of the thin film of the recording layer 2. In other words, the less the material of the recording layer 2 wets the walls of the cylinder 1, the less laser power is needed.

During readout, unmodulated laser beam 7' whose intensity is much less than during recording is applied to the recording layer 2 of the optical information carrier rotating about its axis 8. The laser beam 7' is focused by an objective lens 9 and, when reflected from the recording layer 2, is modulated by the recording contained therein. A photodetector (not shown) converts the information contained in the reflected laser beam into electrical signals.

An optical memory, according to the invention, includes a hollow optical carrier 10 (FIG. 2) and an erasing unit 11 provided with a circuit initiating a high-frequency discharge, which is a high-frequency generator of any known type equipped with electrodes 12 and 13 electrically connected to generator terminals 14.

The optical information carrier 10 is placed between the electrodes 12 and 13 so that a high-frequency discharge can be initiated in the space 5 thereof.

An information recording and reading unit 15 comprises a laser 16, a mirror 17 and an objective lens 9 optically connected to the laser 16. The unit 15 transmits a radiation flux to the carrier 10.

This optical memory can erase information recorded on the optical information carrier 1. To this end, the carrier 1 is placed into an electrical field produced between the electrodes 12 and 13 by the high-frequency generator. A high-frequency discharge is produced in the space 5 of the carrier 10. The surface of the recording layer 2 is levelled or smoothed over by ionic dispersion and reverse diffusion of dispersed atoms of the material of the recording layer 2 on the walls of the air-tight space 5 and, also, by the heating of the recording layer 2 by bombardment by charged particles. This means that information contained in the layer 2 is erased without serious destruction or even elimination of the layer 2 itself. As the optical carrier 10 rotates about its axis 8, the entire recording layer 2 is levelled off on the cylinder 1.

The electrodes 12 and 13 are made as plates. The space 5 of the optical carrier 10 is completely enveloped by these electrodes 12 and 13. This arrangement makes it possible to erase information from the entire carrier 10. This construction of the memory is extremely compact.

The axis 8 of rotation of the optical carrier 10 is arranged parallel to the electrodes 12 and 13. However, the optical carrier 10 may be arranged so that its axis 8 is inclined. The electrodes 12 and 13 are arranged either parallel or at an angle to each other and in relation to the optical carrier 10 which, in this case, is placed between the electrodes 12 and 13 so that the recording layer 2 is in a electrode gap 18. The electrodes 12 and 13 should for this purpose be longer than the layer 2.

It is convenient and efficient to make electrodes 19 and 20 (FIG. 3) as two half-cylinders having the same radius which exceeds the external radius of the optical carrier 10. The electrodes 19 and 20 are arranged so that a surface is formed coaxial to the carrier 10.

The number of electrodes enveloping the optical information carrier 10 may be more than two and depends on the desired shape of the electrical field.

Figure 3:
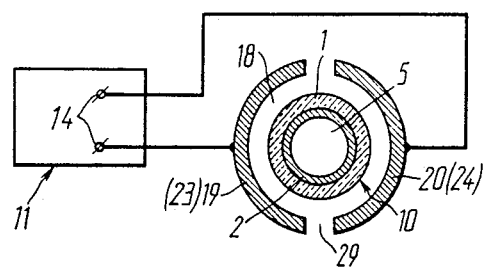
FIG. 3 illustrates an optical memory equipped with coaxially arranged electrodes, according to the invention.
Figure 4:
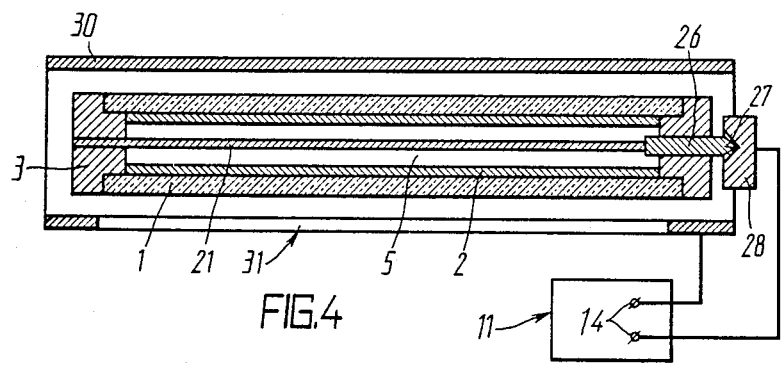
FIG. 4 illustrates an optical memory featuring an electrode located inside the space of the optical information carrier, according to the invention.

Referring to FIG. 4, another embodiment of the optical memory according to the invention features a different arrangement of electrodes. Here, an electrode 21 is placed inside an air-tight space 22, while two other electrodes 23 and 24 are placed outside an optical carrier 25 as illustrated in FIG. 3. The electrode 21 is equipped with an electrical terminal 26 with a needle 27 contacting a support 28 and, therefore, connected to the unit 11.

A slot 29 between the electrodes 19 and 20 runs parallel to the axis 8 of rotation of the optical carrier 10. The radiation flux from the laser 16 (FIG. 2) is supplied through this slot 29 to the recording layer 2. In FIG. 4 the flux of the laser 16 is supplied to the optical carrier 25 between the electrodes 19 and 20. But, it should be noted that the optical memory of FIG. 4 is provided with two electrodes 21 and 30, the latter being enveloped by the carrier 25. For the radiation flux of the laser 16 to hit the recording layer 2 a slot 31 is provided in the electrode 30.

In one more embodiment of an optical memory, a cylindrical optical information carrier 32 comprises two hollow coaxial cylinders 33 and 34. A recording layer 35 is available on the external surface of the internal cylinder 33, while a recording layer 36 is available on the internal surface of the cylinder 34 and faces the layer 35. A space 37 between the cylinders 33 and 34 is made air-tight by bushings 38 and 39 and is filled by a gas inert in relation to the material of the carrier 32 and layers 35 and 36.

One electrode 40 is placed inside a space 41 of the internal cylinder 33, while other electrodes 42 and 43 are placed outside the carrier 32.

Figure 5:
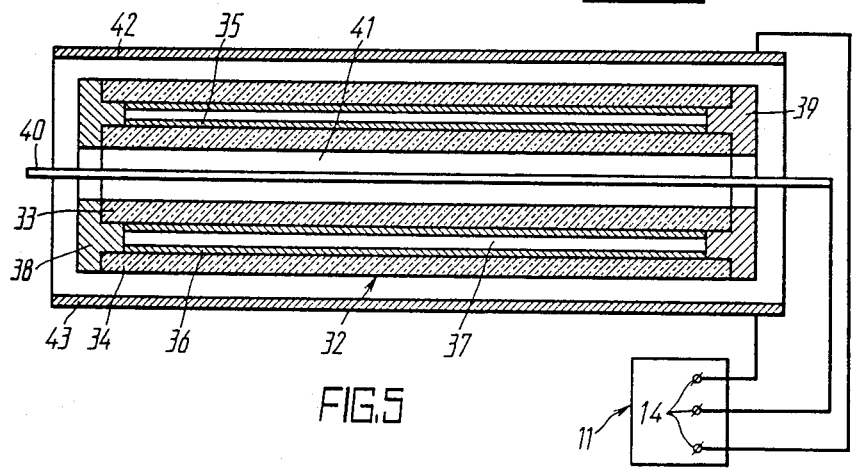
FIG. 5 illustrates one more embodiment of an optical memory, according to the invention.

The length of electrodes 19–20, 23–24, 30, and 40–43 (FIGS. 3–5) exceeds the length of the recording layer 2 or layers 35–36.

The optical memory operates as follows.

Figure 2:
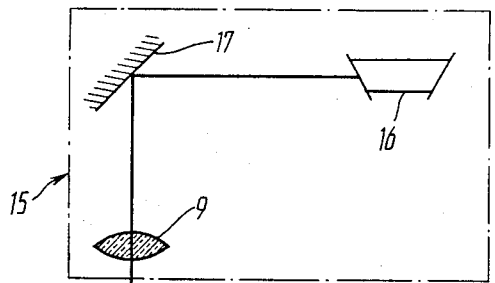
FIG. 2 illustrates an optical memory equipped with a cylindrical optical information carrier, according to the invention.
Figure 2:
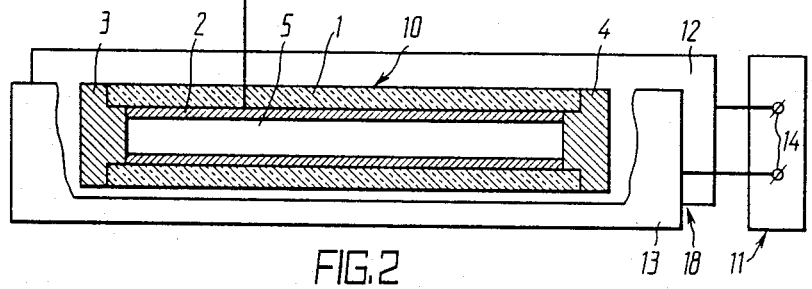

During recording, the beam of the laser 16 is focused and modulated by the signal to be recorded and supplied to the optical information carrier 1 (FIGS. 1, 2). Craters are produced in the recording layer 2 of the optical carrier 1 rotating about its axis 8. These craters are produced by ejection of the material of the recording layer 2 from the irradiated zone with beads around craters. In this manner, portions of the layer 2 change their reflectivity and thus store recorded information.

To erase recorded information, the optical information carrier 1 is exposed to a high-frequency electrical field produced between the electrodes 12 and 13, 23 and 24, 30, 40–43 by an initiating circuit. A high-frequency discharge is initiated in the air-tight space 5 of the optical carrier 1 to start ion dispersion and reverse diffusion of dispersed atoms onto the recording layer 2. These processes result in destruction of portions storing information. A uniform layer 2 without beaded craters is completely restored or regenerated. Rotation of the optical carrier 1 about its axis 8 and large amounts of heat produced in the area of the recording layer 2 are contributing factors.

After the erasure process is over, the recording layer 2 is completely regenerated and the optical carrier is once more ready for recording information.

Devices of FIGS. 3–6 operate similarly both during recording and readout. The electrical field produced by the electrodes 19 (FIG. 3) and 20 is not uniform, but rotation of the optical carrier 10 in this embodiment of the invention ensures an extremely high quality of erasure.

The regenerated recording layer 2 (FIGS. 1–4) and 35–36 (FIG. 6) is of a very high quality. It makes the optical memory very reliable and increases the number of rewrite cycles to several millions. This means that its service life is, in practical terms, unlimited.

This invention can be used in computers, in video and sound recording devices, information storing and processing systems and, in particular, in external storage devices.

We claim:

1. A method for erasing information recorded on an optical information carrier comprising the step of exposing optical information carrier (10) to an external action erasing recorded information, said external action being an electrical field ensuring a high-frequency discharge within an air-tight closed space (15) of the optical carrier (10).

2. A method as claimed in claim 1, characterized in that the optical information carrier (10) rotates about its axis (8).

3. An optical storage device comprises an optical information carrier (10) with a recording layer (2), an information recording and reading unit (15), and an information erasing unit (11), said erasing unit (11) comprising a circuit for initiating a high-frequency discharge, which is equipped with at least two electrodes (12,13), while the optical information carrier (10) has an air-tight closed space (5) filled with gas inert in relation to the material of the recording layer (2) and the hollow cylinder (1) and is disposed between the electrodes (12,13) so that the high-frequency discharge is initiated within the air-tight space (5) thereof.

4. An optical storage device as claimed in claim 3, wherein each electrode (19,20) of the high-frequency discharge initiating circuit is arranged so that a part of a surface is formed coaxial to the cylindrical optical information carrier (10).

5. An optical storage device as claimed in claim 3, wherein one electrode (21) of the high-frequency discharge initiating circuit is located inside the air-tight closed space (22) of the hollow cylinder (1), while other electrodes (23,24) are located outside the hollow cylinder (1).

6. An optical storage device as claimed in claim 3, wherein the optical information carrier (32) comprises two coaxial hollow cylinders (33,34) with an air-tight closed space (37) between them, one electrode (40) of the high-frequency discharge initiating circuit (3) being located inside the space (41) of the second cylinder (34), while other electrodes (42,43) are located outside the first hollow cylinder (33).

* * * * *